US012609118B2

(12) United States Patent
Lee

(10) Patent No.: US 12,609,118 B2
(45) Date of Patent: Apr. 21, 2026

(54) METHOD AND APPARATUS FOR INFERRING USER INTENTION IN VEHICLE VOICE RECOGNITION SYSTEM

(71) Applicants:Hyundai Motor Company, Seoul (KR); Kia Corporation, Seoul (KR)

(72) Inventor: Yoon Jung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 181 days.

(21) Appl. No.: 18/424,070

(22) Filed: Jan. 26, 2024

(65) Prior Publication Data

US 2025/0095645 A1 Mar. 20, 2025

(30) Foreign Application Priority Data

Sep. 19, 2023 (KR) ........................ 10-2023-0124693

(51) Int. Cl.
*G10L 15/22* (2006.01)
*G10L 15/18* (2013.01)
*G10L 15/26* (2006.01)

(52) U.S. Cl.
CPC .......... *G10L 15/22* (2013.01); *G10L 15/1822* (2013.01); *G10L 15/26* (2013.01); *G10L 2015/223* (2013.01)

(58) Field of Classification Search
CPC ......... G10L 15/18; G10L 15/22; G06F 40/30; G06F 40/35
See application file for complete search history.

(56) References Cited

U.S. PATENT DOCUMENTS

| | | | | | |
|---|---|---|---|---|---|
| 11,164,586 | B2 * | 11/2021 | Kim | .................. | G10L 25/84 |
| 12,165,640 | B2 * | 12/2024 | Zhang | .............. | G10L 13/02 |
| 2012/0035935 | A1 * | 2/2012 | Park | .................. | G10L 15/22 |
| | | | | | 704/E21.001 |
| 2019/0115015 | A1 | 4/2019 | Yae | | |
| 2020/0074990 | A1 * | 3/2020 | Kim | .................. | G10L 15/16 |
| 2022/0139373 | A1 * | 5/2022 | Weisz | .............. | G10L 15/01 |
| | | | | | 704/231 |
| 2023/0290342 | A1 * | 9/2023 | Kim | .................. | G06F 40/30 |

FOREIGN PATENT DOCUMENTS

| | | | |
|---|---|---|---|
| KR | 101628109 | B1 | 6/2016 |
| KR | 102417898 | B1 | 7/2022 |

* cited by examiner

*Primary Examiner* — Daniel Abebe
(74) *Attorney, Agent, or Firm* — Slater Matsil, LLP

(57) ABSTRACT

An embodiment computer-implemented method for predicting an intention of a user includes receiving from a vehicle first utterance data obtained by converting a voice command of the user into text, performing natural language understanding to attempt to decide the intention of the user from the first utterance data, predicting the intention of the user using stored pattern data in response to failing to decide the intention of the user, wherein the stored pattern data includes a plurality of patterns and confidence generated based on second utterance data received from each of a plurality of vehicles that are unable to decide the intention of the user and subsequent action data, generating a prompt suggesting an operation based on the predicted intention, and transmitting the prompt to the vehicle.

20 Claims, 4 Drawing Sheets

METHOD AND APPARATUS FOR INFERRING USER INTENTION IN VEHICLE VOICE RECOGNITION SYSTEM

CROSS-REFERENCE TO RELATED APPLICATIONS

This application claims the benefit of Korean Patent Application No. 10-2023-0124693, filed on Sep. 19, 2023, which application is hereby incorporated herein by reference.

TECHNICAL FIELD

The present disclosure relates to a method and apparatus for inferring user intention in a vehicle voice recognition system.

BACKGROUND

The description in this section merely provides background information related to embodiments of the present disclosure and does not necessarily constitute the related art.

Natural language recognition is an important topic recently in devices that communicate with people, but it is very difficult for the devices to fully understand all natural languages used by people and respond accordingly.

A vehicle voice recognition system supports a voice recognition function through natural language processing. However, it is not possible to register all commands, and thus it is managed by designating representative commands and then manually registering variant commands. For example, the command uttered by a user is recognized, and when the recognized command is a representative command or a variant command registered in advance, content or services corresponding to the command are provided to the user.

Since variant commands are manually reviewed, registered, and managed, it takes time for even frequently used utterances to be applied. Furthermore, if a user's utterance is even slightly different from the registered representative command or registered variant command, the user's utterance is often not recognized, lowering the reliability of the voice recognition function.

Conventional technologies have been proposed addressing cases where voice recognition for user commands fails. In the case of technology that infers intention of a specific user using his or her patterns, it does not affect the improvement of the usability of the voice recognition function for other users. In the case of technology that analyzes the cause of voice recognition failure and notifies a user of the analysis results, there is no correction logic after analysis, so it has no influence on improvement of a user voice recognition rate.

SUMMARY

Embodiments of the present disclosure provide an apparatus and a method for predicting a user intention corresponding to an ambiguous voice recognition command based on the ambiguous voice recognition command uttered by a user and subsequent repeated action information collected from a plurality of vehicles.

Embodiments of the present disclosure enhance accuracy of user intention prediction by utilizing a feedback of a user on the proposed operation based on the predicted user intention.

The embodiments of the present disclosure are not limited to those mentioned above, and other embodiments not mentioned herein will be clearly understood by those skilled in the art from the following description.

One embodiment of the present disclosure provides a computer-implemented method for predicting an intention of a user, including receiving from a vehicle first utterance data obtained by converting a voice command of the user into text, performing natural language understanding to attempt to decide the intention of the user from the first utterance data, predicting the intention of the user using stored pattern data in response to failing to decide the intention of the user, wherein the stored pattern data includes a plurality of patterns and confidence generated based on second utterance data received from each of a plurality of vehicles that are unable to decide the intention of the user and subsequent action data, generating a prompt suggesting an operation based on the predicted intention, and transmitting the prompt to the vehicle.

Another embodiment of the present disclosure provides a system comprising one or more processors and a memory operatively coupled to the one or more processors, the memory storing commands that, in response to execution of the commands by the one or more processors, cause the one or more processors to perform operations, wherein the operations include receiving from a vehicle first utterance data obtained by converting a voice command of the user into text, performing natural language understanding to attempt to decide the intention of the user from the first utterance data, predicting the intention of the user using stored pattern data in response to failing to decide the intention of the user, wherein the stored pattern data includes a plurality of patterns and confidence generated based on second utterance data received from each of a plurality of vehicles that are unable to decide the intention of the user and subsequent action data, generating a prompt suggesting an operation based on the predicted intention, and transmitting the prompt to the vehicle.

According to an embodiment of the present disclosure, by utilizing ambiguous voice recognition command and subsequent repeated action information collected from a plurality of vehicles, the usability of a user's voice recognition function can be improved.

According to an embodiment of the present disclosure, by utilizing a feedback of a user on the proposed operation based on the predicted user intention, the accuracy of user intention prediction can be improved.

DETAILED DESCRIPTION OF ILLUSTRATIVE EMBODIMENTS

Figure 1:
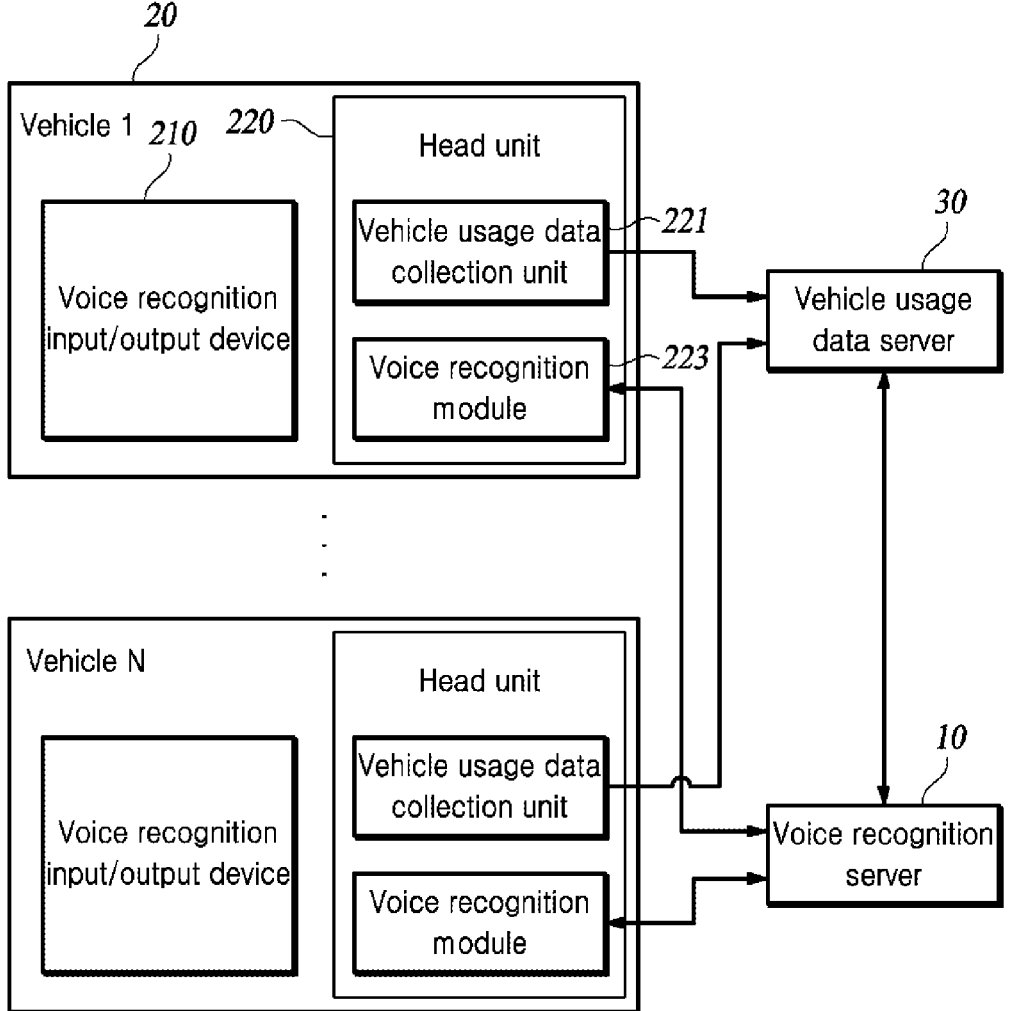
FIG. 1 is a configuration diagram illustrating a vehicle voice recognition system according to an embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the embodiments of the present disclosure will be omitted for the purpose of clarity and for brevity.

Various ordinal numbers or alpha codes such as first, second, i), ii), a), b), etc. are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of embodiments of the present disclosure to be presented below in conjunction with the accompanying drawings is intended to describe exemplary embodiments of the present disclosure and is not intended to represent the only embodiments in which the technical idea of the present disclosure may be practiced.

The term "voice recognition command" in embodiments of the present disclosure can be used interchangeably with the term "utterance data". Herein, the term "voice recognition command" refers to data converted from a speaker's voice into text through a STT (Speech to Text) module.

The term "ambiguous voice recognition command" or "ambiguous utterance data" in embodiments of the present disclosure refers to voice recognition command or utterance data where a user's intention cannot be determined and may include a free-form voice recognition command or utterance data different from commands registered in the vehicle voice recognition system.

Embodiments of the present disclosure relate to a technology capable of inferring a user's intention and suggesting a proper operation even when an ambiguous voice recognition command is input, by discovering association rules from learning data which consist of a user's utterance of an ambiguous voice recognition command and subsequent actions and are collected from a plurality of vehicles.

FIG. 1 is a configuration diagram illustrating a vehicle voice recognition system according to an embodiment of the present disclosure.

Referring to FIG. 1, a vehicle voice recognition system according to an embodiment of the present disclosure includes a voice recognition server 10, a plurality of vehicles 20, and a vehicle usage data server 30. According to various embodiments, the voice recognition server 10 and the vehicle usage data server 30 may be integrally implemented.

First, in a typical normal operation scenario, each component of the vehicle voice recognition system operates as follows. The voice command uttered by a user input through a voice recognition input/output device 210 of the vehicle 20 is converted into text in a voice recognition module 223 of a head unit 220, and the resulting utterance data is transmitted to the voice recognition server 10. The voice recognition server 10 determines or predicts an intention of a user from the received utterance data and then transmits a response prompt to the voice recognition module 223, and the response prompt is output through the voice recognition input/output device 210.

The vehicle 20 is provided with the voice recognition input/output device 210 and the head unit 220.

The voice recognition input/output device 210 receives a voice command from a user (for example, a driver or a vehicle occupant) or outputs a response prompt converted into a voice to the user, and it includes a microphone, a speaker, etc.

The head unit 220 includes all or part of a vehicle usage data collection unit 221 and the voice recognition module 223.

The vehicle usage data collection unit 221 collects vehicle usage data of a user. Herein, the vehicle usage data may include, but is not limited to, data regarding the manipulation of devices within a vehicle, such as navigation manipulation, radio manipulation, air conditioner manipulation, heater manipulation, and heating/seat manipulation of a user. The vehicle usage data collected from a plurality of vehicles may be transmitted to the vehicle usage data server 30 using a wireless communication network.

The voice recognition module 223 uses STT processing technology to convert voice commands uttered by a user into text and/or other expressions or embeddings (hereinafter referred to as "text"). The voice recognition module 223 converts the voice command of the user input from the voice recognition input/output device 210 into text and outputs the utterance data. The utterance data is transmitted to the voice recognition server 10 using a wireless communication network. Because the head unit 220 of a vehicle may be relatively limited in terms of computing resources (for example, processor cycle, memory, battery, etc.), in another embodiment, the voice recognition module 223 may be included in the voice recognition server 10.

In addition, the voice recognition module 223 may be configured to include a Text to Speech (TTS) module that converts text into computer synthesized voice. For example, the voice recognition module 223 converts the response prompt received from the voice recognition server 10 into a voice using the TTS module and outputs the converted voice through the voice recognition input/output device 210.

The vehicle usage data server 30 stores vehicle usage data transmitted from the plurality of vehicles 20 and provides the vehicle usage data to the voice recognition server 10.

Figure 2:
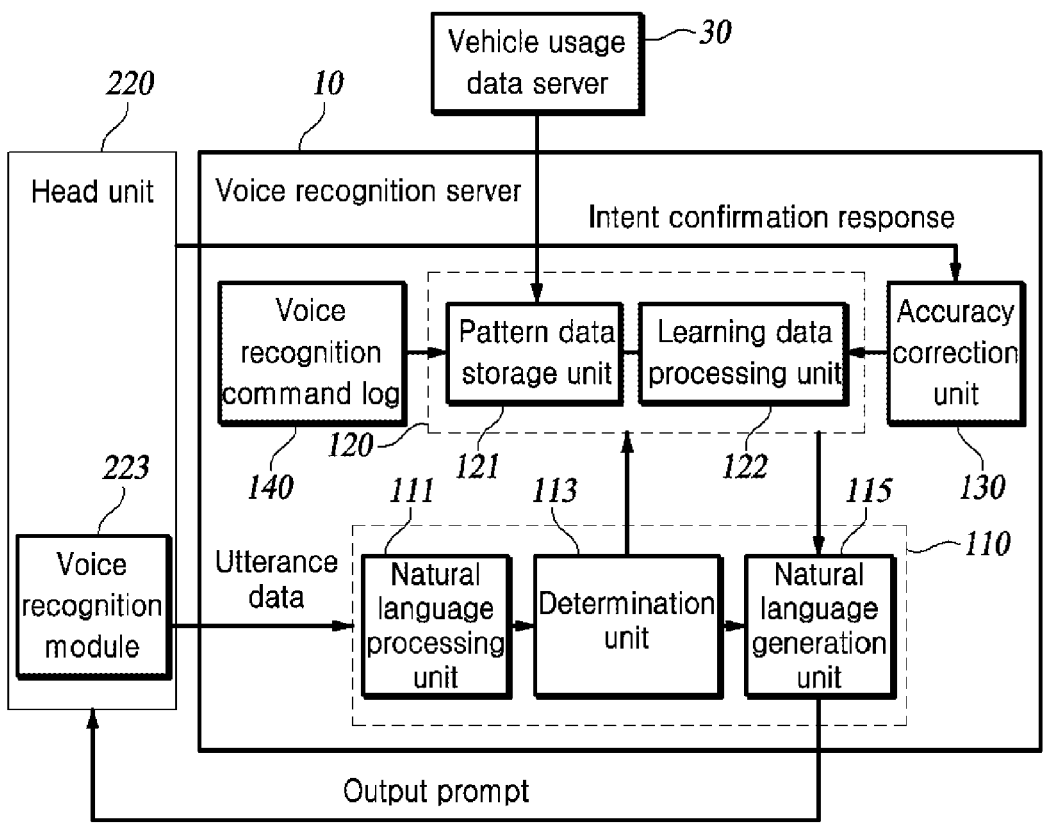
FIG. 2 is a detailed configuration diagram illustrating a voice recognition server according to an embodiment of the present disclosure.

With reference to FIG. 2, the voice recognition server 10 will be described in detail.

Referring to FIG. 2, the voice recognition server 10 includes all or part of a natural language processing device 110, a machine learning module 120, an accuracy correction unit 130, and a voice recognition command log 140.

The natural language processing device 110 includes a natural language processing unit 111, a determination unit 113, and a natural language generation unit 115. The natural language processing unit 111 and the determination unit 113 may collectively perform natural language understanding.

The natural language processing unit 111 may identify various types of grammar information in input utterance data and generate annotated output. To this end, the natural language processing unit 111 may perform morpheme analysis, part-of-speech tagging, syntax analysis, etc.

The determination unit 113 determines or decides an intention of a user based on the utterance data or the output of the natural language processing unit 111. To this end, the determination unit 113 may refer to one or more databases (not shown) including a plurality of mappings between utterance data and intention, but it is not limited thereto.

When failing to decide the user intention from the utterance data, the natural language processing device 110 transmits ambiguous utterance data to the machine learning module 120 and acquires a response by querying the machine learning module 120 for a user intention corresponding to the ambiguous utterance data.

The natural language generation unit 115 may select and/or generate a prompt that is a natural language output based on the user intention decided by the determination unit 113 or the user intention predicted by the machine learning module 120 and transmit the prompt to the voice recognition module 223 of the vehicle 20. For example, when the user intention can be decided, a prompt notifying that an operation based on the decided intention is performed may be selected and transmitted. For example, when the user intention can be predicted, a prompt suggesting an operation based on the predicted intention may be generated and transmitted. For example, when the user intention cannot be decided and predicted, a prompt guiding that the voice recognition function is not supported, a prompt requesting clear utterance again, etc. may be generated and transmitted, but it is not limited thereto.

The machine learning module 120 stores a plurality of patterns and confidences generated based on ambiguous utterance data and subsequent action data received from each of a plurality of vehicles as pattern data and predicts a user intention by applying association rules to the stored pattern data. To this end, the machine learning module 120 includes a pattern data storage unit 121 and a learning data processing unit 122.

The pattern data storage unit 121 stores patterns consisting of ambiguous utterance data and subsequent action data of the speaker. Herein, the subsequent action data includes the vehicle usage data and retried utterance data of the speaker within a certain period of time after the occurrence of the ambiguous utterance data. The vehicle usage data may be acquired from the vehicle usage data server 30. The retried utterance data may be obtained from the voice recognition command log 140.

When storing a pattern existing in pre-stored pattern data, the learning data processing unit 122 calculates confidence and support for the pattern using association rules and stores the same together with the pattern.

The term "support" refers to the probability that the ambiguous utterance data (A) of the pattern and the subsequent action data (B) of the pattern are associated among all pre-stored pattern data and may be calculated as $P(A \cap B)$.

The term "confidence" refers to the conditional probability that subsequent action data (B) of the pattern will occur after the ambiguous utterance data (A) of the pattern and may be calculated as $P(A \cap B)/P(A)$.

The learning data processing unit 122 may correct and store the confidence calculated for the pattern using the accuracy of the pattern calculated by the accuracy correction unit 130, which will be described later.

The machine learning module 120 may predict a user intention from the ambiguous utterance data received from the natural language processing device 110 and transmit the predicted intention to the natural language processing device 110 in response.

The machine learning module 120 may predict a user intention based on the action data of a pattern with confidence equal to or greater than a first threshold among at least one pattern including ambiguous utterance data in pre-stored pattern data. When there are a plurality of patterns with confidence equal to or greater than the first threshold, the machine learning module 120 may select the pattern with the greatest confidence and predict the user intention based on the action data of the pattern.

When there is no pattern with confidence equal to or greater than the first threshold, the machine learning module 120 may transmit that there is no predicted intention to the natural language processing device 110 in response.

The accuracy correction unit 130 receives a confirmation response of a user to a prompt suggesting an operation based on the predicted intention, calculates the accuracy of the pattern that is the basis for predicting a user intention, and uses the calculated accuracy to correct the confidence value of the pattern that is the basis for predicting the user intention.

The accuracy is defined as the number of times of positive confirmation responses from a user compared to the total number of times that a prompt suggesting an operation based on the intention predicted from the pattern was transmitted to a plurality of vehicles. For example, assuming that the total number of times that a prompt suggesting an operation based on the intention predicted from the pattern is transmitted to a plurality of vehicles is 100 times, and that the confirmation response of 'Yes' received from a user is 80 times, the accuracy may be calculated as 0.8.

When the calculated accuracy is equal to or less than a threshold, the accuracy correction unit 130 may make a correction by lowering the confidence value of the pattern that is the basis for predicting a user intention. This is to readjust the confidence of the pattern and minimize the display of unnecessary prompts because when the accuracy calculated based on the confirmation response of a user falls below the threshold, it is determined to be a case where it is difficult to trust the prediction of the user intention based on the pattern.

The voice recognition command log 140 stores all utterance data received by the voice recognition server 10 from the voice recognition module 223 of the vehicle 20. The voice recognition command log 140 may store information such as the vehicle that transmitted the utterance data and the reception time of the utterance data along with the utterance data.

Figure 3:
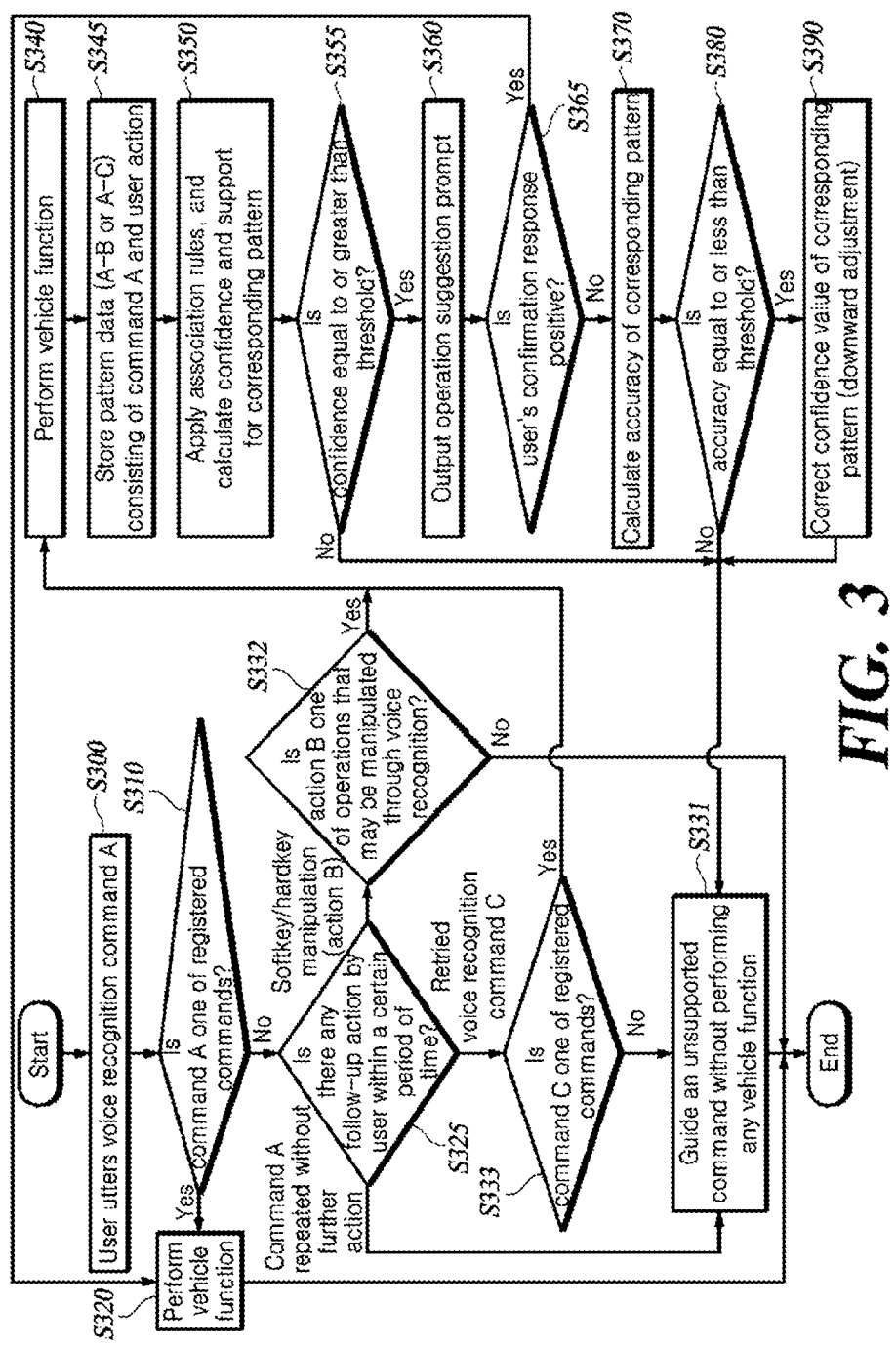
FIG. 3 is a diagram illustrating an operating mechanism of a vehicle voice recognition system according to an embodiment of the present disclosure.

FIG. 3 is a diagram illustrating an operating mechanism of a vehicle voice recognition system according to an embodiment of the present disclosure.

Referring to FIG. 3, voice recognition command A, which converts the voice command uttered by a user in the vehicle 20 into text, is transmitted to the voice recognition server 100 (S300).

The natural language processing device 110 of the voice recognition server 100 determines whether the voice recognition command A is a command that may decide an intention (S310).

As a result of the determination, when the intention of a user can be decided from the voice recognition command A, the function corresponding to voice recognition command A is performed (S320).

As a result of the determination, when the intention of a user cannot be decided from the voice recognition command A, the subsequent actions of the user are monitored within a certain period of time (timeAfterVRFail) to determine whether the subsequent action has occurred and the type of the subsequent action (S325).

When there is no subsequent action by a user or only the voice recognition command A is repeated within a certain period of time, a prompt guiding that the voice recognition function is not supported or a prompt requesting clear utterance again is transmitted to a vehicle (S331).

When subsequent action B, which operates a function of a vehicle using the soft/hard keys of a user, is performed within a certain period of time, it is determined whether the subsequent action B is an operation that may be manipulated through voice recognition (S332). When it is determined that the subsequent action B is not an operation that may be manipulated through voice recognition, stage S331 is performed. When it is determined that the subsequent action B is an operation that may be manipulated through voice recognition, the function corresponding to the subsequent action B is performed (S340), the pattern (A-B) consisting of the voice recognition command A and the subsequent action B is stored (S345), and the confidence and support for the pattern (A-B) are calculated and stored together by applying association rules to pre-stored pattern data (S350).

When voice recognition command C, which a user retried within a certain period of time, is input, it is determined whether the voice recognition command C is a command whose intention may be decided (S333). When it is determined that the voice recognition command C is not a command whose intention may be determined, stage S331 is performed. When it is determined that the voice recognition command C is a command whose intention may be decided, the function corresponding to the voice recognition command C is performed (S340), the pattern (A-C) consisting of the voice recognition command A and the retried voice recognition command C is stored (S345), and the confidence and support for the pattern (A-C) are calculated and stored together by applying association rules to pre-stored pattern data (S350).

In order to predict the user intention for the voice recognition command A where the intention of a user may not be decided, it is determined whether the confidence of at least one pattern including the voice recognition command A in the pre-stored pattern data is equal to or greater than a first threshold (confidenceLevelCriteria) (S355).

When there is no pattern with confidence equal to or greater than the first threshold, stage S331 is performed. When there is a pattern with confidence equal to or greater than the first threshold, a prompt suggesting an operation based on the intention of a user predicted based on the action data of the pattern is generated and output on a head unit screen of a vehicle (S360).

The confirmation response of a user to the prompt suggesting an operation based on the predicted intention is determined (S365). When the confirmation response is positive ('Yes'), the suggested operation is performed (S320). When the confirmation response is negative ('No'), a prompt guiding that a voice recognition function is not supported or a prompt requesting clear utterance again is transmitted to a vehicle (S331), the accuracy of the pattern that is the basis for predicting a user intention is calculated (S370), the determination of whether the calculated accuracy is equal to or less than a threshold (for example, 90%) is made (S380), and the confidence value of the pattern that is the basis for predicting an intention of a user is corrected when the calculated accuracy is equal to or less than the threshold (S390).

As an example, in the vehicle voice recognition system, it is assumed that "Increase the temperature" is a supported command (in other words, a voice recognition command whose intention may be decided), and "I feel cold" is an unsupported command (in other words, a voice recognition command whose intention may not be decided).

When a user utters "I feel cold" as a voice recognition command, since this is an unsupported command, the action of a user is monitored after "I feel cold" is uttered. Thereafter, when the user utters "Increase the temperature" with a voice recognition command or manually increases the temperature in an air conditioning menu, the pattern is stored as a set of the command of "I feel cold" and the command of "Increase the temperature," or the pattern is stored as a set of the command of "I feel cold" and a user's action increasing the air conditioning temperature.

When the confidence and support of the pattern in which a user's action increasing the temperature is performed after the command of "I feel cold" reaches a certain value or higher, the user intention for the command of "I feel cold" is predicted to be "Increase the temperature" and a prompt asking "Do you want to increase the vehicle temperature?" is output on the head unit to suggest an operation.

When a user answers "yes," an operation is performed to increase the temperature. When the user answers "no," depending on whether the calculated accuracy is equal to or less than a threshold, the confidence of the pattern consisting of the command of "I feel cold" and the command of "Increase the temperature" or the pattern consisting of the command of "I feel cold" and a user's action increasing the air conditioning temperature is corrected, and the operation to increase the temperature is not performed.

Figure 4:
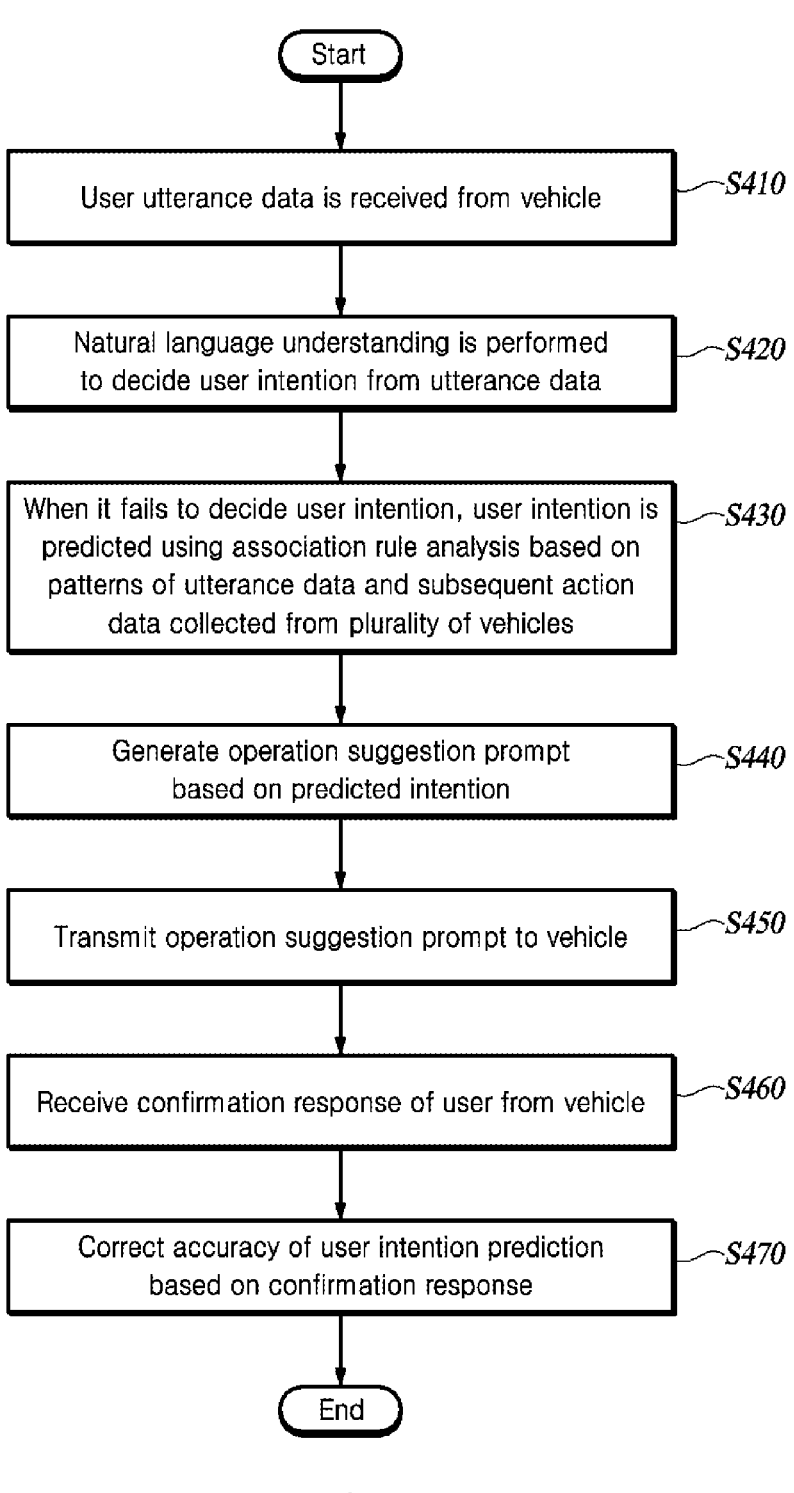
FIG. 4 is a flowchart of a method for predicting an intention of a speaker in a vehicle voice recognition system according to an embodiment of the present disclosure.

FIG. 4 is a flowchart of a method for predicting an intention of a speaker in a vehicle voice recognition system according to an embodiment of the present disclosure.

Referring to FIG. 4, first utterance data obtained by converting the voice command of a user into text is received from a vehicle (S410).

Natural language understanding is performed to decide the intention of a user from the first utterance data (S420). The process of performing natural language understanding may include identifying various types of grammatical information and generating an annotated output by performing morphological analysis, part-of-speech tagging, and syntactic analysis on the input utterance data. The process of performing natural language understanding may include a process of deciding an intention corresponding to the first utterance data with reference to a database including one or more mappings between the utterance data and the intention.

When it fails to decide an intention of a user, the intention of the user is predicted using the stored pattern data (S430). A pattern that includes the first utterance data and has confidence equal to or greater than a first threshold may be extracted from the pattern data, and the intention of the user may be predicted based on the action data of the extracted pattern.

Herein, the stored pattern data stores a plurality of patterns and confidence generated based on second utterance data that may not decide a user intention and subsequent action data received from each of a plurality of vehicles. Herein, the action data may include a user's action of operating the function of a vehicle or third utterance data obtained by converting a voice command of the user into text, received within a certain period of time after the second utterance data is received. The third utterance data refers to utterance data that may decide an intention of the user by performing natural language understanding.

A prompt suggesting an operation based on the predicted intention is generated (S440).

The generated operation suggestion prompt is transmitted to a vehicle (S450).

The confirmation response of a user to the operation suggestion prompt is received from a vehicle (S460). The confirmation response of the user may be positive or negative.

Based on the received confirmation response, the accuracy of user intention prediction may be corrected (S470). Based on the received confirmation response, the accuracy of user intention prediction may be calculated, and the confidence of the pattern on which the user intention prediction is based may be corrected using the calculated accuracy. For example, when the calculated accuracy is equal to or less than a threshold, corrections may be made to lower the confidence value of the pattern that is the basis for predicting an intention of a user.

Each component of the device or method according to an embodiment of the present disclosure may be implemented by hardware, software, or a combination of hardware and software. In addition, the function of each component may be implemented by software and the microprocessor may be implemented to execute the function of software corresponding to each component.

Various implementations of the systems and techniques described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications, or code) include instructions for a programmable processor and are stored on a "computer-readable recording medium".

The computer-readable storage medium includes all kinds of storage devices that store data readable by a computer system. The computer-readable storage medium may include a non-volatile or non-transitory medium such as ROM, CD-ROM, magnetic tape, floppy disk, memory card, hard disk, magneto-optical disk, and storage device, and may also further include a transitory medium such as a data transmission medium. Moreover, the computer-readable storage medium may be distributed in computer systems connected through a network, and computer-readable codes may be stored and executed in a distributed manner.

In the flowcharts in the present specification, it is described that each process sequentially occurs, but this is merely an example of the technology of an embodiment of the present disclosure. In other words, a person having ordinary skill in the art to which an embodiment of the present disclosure pertains may make various modifications and variations by changing the orders described in the flowcharts in the present specification or by undergoing one or more of the processes in parallel within the essential characteristics of an embodiment of the present disclosure, so the flowcharts in this specification are not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A computer-implemented method for predicting an intention of a first user, the method comprising:
   receiving, from a vehicle, first utterance data obtained by converting a voice command of the first user into text;
   performing natural language understanding to attempt to decide the intention of the first user from the first utterance data;
   in response to failing to decide the intention of the first user, receiving, from the vehicle, first subsequent action data occurring within a first predetermined time period after the first utterance data, the first subsequent action data comprising vehicle usage data indicating an operation performed by the first user on a vehicle function;
   predicting the intention of the first user using stored pattern data, wherein the stored pattern data comprises a plurality of patterns and confidence values generated based on:
      (i) a plurality of second utterance data, wherein each instance of second utterance data (a) was received by another vehicle and (b) failed to result in a decision regarding an intention of a user of the other vehicle that is different than the first user; and
      (ii) a plurality of second subsequent action data, wherein each second subsequent action data occurs within a second predetermined time period after a single corresponding second utterance data of the plurality of second utterance data, wherein each second subsequent action data comprises vehicle usage data indicating an operation performed on a vehicle function of a particular vehicle by a user, of the other vehicle, that is different than the first user;
   generating a prompt suggesting an operation based on the predicted intention; and
   transmitting the prompt to the vehicle.

2. The method of claim 1, wherein performing the natural language understanding comprises attempting to decide the intention corresponding to the first utterance data with reference to a database including one or more mappings between utterance data and intentions.

3. The method of claim 1, wherein the first subsequent action data further comprises retried utterance data obtained by converting a voice command of the first user occurring within the first predetermined time period after the first utterance data.

4. The method of claim 1, wherein at least one instance of the second subsequent action data further comprises retried utterance data obtained by converting a voice command of a user, that is different than the first user, occurring within the second predetermined time period after a single corresponding second utterance data of the plurality of second utterance data, wherein the retried utterance data comprises utterance data capable of being used to decide the intention of the user that is different from the first user by performing the natural language understanding.

5. The method of claim 1, wherein predicting the intention of the first user comprises:
   extracting a pattern that comprises the first utterance data and has a confidence equal to or greater than a first threshold from the pattern data; and
   predicting the intention of the first user based on the action data of the extracted pattern.

6. The method of claim 1, further comprising:
   receiving a confirmation response of the first user to the prompt from the vehicle;
   calculating accuracy of intention prediction of the first user based on the received confirmation response; and correcting a confidence of a pattern that is a basis for predicting the intention of the first user using the calculated accuracy.

7. The method of claim 1, wherein performing natural language understanding to attempt to decide the intention of the first user from the first utterance data comprises:

providing the first utterance data as an input to a machine learning model; and receiving, from the machine learning model, response data indicating that there is no predicted intention for the first utterance data.

8. A system comprising one or more processors and a memory operatively coupled to the one or more processors, the memory storing commands that, in response to execution of the commands by the one or more processors, cause the one or more processors to perform operations, wherein the operations comprise:

receiving, from a vehicle, first utterance data obtained by converting a voice command of a first user into text;

performing natural language understanding to attempt to decide an intention of the first user from the first utterance data;

in response to failing to decide the intention of the first user, receiving, from the vehicle, first subsequent action data occurring within a first predetermined time period after the first utterance data, the first subsequent action data comprising vehicle usage data indicating an operation performed by the first user on a vehicle function;

predicting the intention of the first user using stored pattern data, wherein the stored pattern data comprises a plurality of patterns and confidence values generated based on:

(i) a plurality of second utterance data wherein each instance of second utterance data (a) was received by another vehicle and (b) failed to result in a decision regarding an intention of a user, of the other vehicle, that is different than the first user; and (ii) a plurality of second subsequent action data, wherein each second subsequent action data occurs within a second predetermined time period after a single corresponding second utterance data of the plurality of second utterance data, wherein each second subsequent action data comprises vehicle usage data indicating an operation performed on a vehicle function of a particular vehicle by a user, of the other vehicle, that is different than the first user;

generating a prompt suggesting an operation based on the predicted intention; and transmitting the prompt to the vehicle.

9. The system of claim 8, wherein performing the natural language understanding comprises attempting to decide the intention corresponding to the first utterance data with reference to a database including one or more mappings between utterance data and intentions.

10. The system of claim 8, wherein the first subsequent action data further comprises retried utterance data obtained by converting a voice command of the first user occurring within the first predetermined time period after the first utterance data.

11. The system of claim 8, wherein at least one instance of the second subsequent action data further comprises retried utterance data obtained by converting a voice command of a user, that is different than the first user, occurring within the second predetermined time period after a single corresponding second utterance data of the plurality of second utterance data, wherein the retried utterance data comprises utterance data capable of being used to decide the intention of the user that is different from the first user by performing the natural language understanding.

12. The system of claim 8, wherein predicting the intention of the first user comprises:

extracting a pattern that comprises the first utterance data and has a confidence equal to or greater than a first threshold from the pattern data; and predicting the intention of the first user based on the action data of the extracted pattern.

13. The system of claim 8, wherein the operations further comprise:

receiving a confirmation response of the first user to the prompt from the vehicle;

calculating accuracy of intention prediction of the first user based on the received confirmation response; and correcting a confidence of the pattern that is a basis for predicting the intention of the first user using the calculated accuracy.

14. The system of claim 8, wherein performing natural language understanding to attempt to decide the intention of the first user from the first utterance data comprises:

providing the first utterance data as an input to a machine learning model; and receiving, from the machine learning model, response data indicating that there is no predicted intention for the first utterance data.

15. A vehicle voice recognition system, the system comprising:

a vehicle comprising:

a voice recognition input/output device configured to receive a voice command uttered by a first user in the vehicle; and a head unit comprising a vehicle usage data collection unit and a voice recognition module, wherein the voice recognition module is configured to convert the voice command into text to create first utterance data;

a vehicle usage data server configured to store vehicle usage data from a plurality of vehicles including the vehicle; and a voice recognition server configured to receive the utterance data and the vehicle usage data, wherein the voice recognition server comprises:

one or more processors; and a storage device storing a program to be executed by the one or more processors, the program including instructions for:

performing natural language understanding to attempt to determine an intention of the first user from the first utterance data;

in response to failing to decide the intention of the first user, receiving, from the vehicle, first subsequent action data occurring within a first predetermined time period after the first utterance data, the first subsequent action data comprising vehicle usage data indicating an operation performed by the first user on a vehicle function;

predicting the intention of the first user using stored pattern data, wherein the stored pattern data comprises a plurality of patterns and confidence values generated based on:

(i) a plurality of second utterance data, wherein each instance of second utterance data (a) was received by another vehicle and (b) failed to result in a decision regarding an intention of a user, of the other vehicle, that is different than the first user; and (ii) a plurality of second subsequent action data, wherein each second subsequent action data occurs within a second predetermined time period after a single corresponding second utterance data of the plurality of second utterance data, wherein each second subsequent action data comprises vehicle usage data indicating an operation performed on a vehicle function of a particular vehicle by a user, of the other vehicle, that is different than the first user;

generating a prompt suggesting an operation based on the predicted intention; and transmitting the prompt to the vehicle.

16. The system of claim 15, wherein performing the natural language understanding comprises attempting to determine the intention corresponding to the first utterance data with reference to a database including one or more mappings between utterance data and intentions.

17. The system of claim 15, wherein the first subsequent action data further comprises retried utterance data obtained by converting a voice command of the first user occurring within the first predetermined time period after the first utterance data.

18. The system of claim 15, wherein at least one instance of the second subsequent action data further comprises retried utterance data obtained by converting a voice command of a user, that is different than the first user, occurring within the second predetermined time period after a single corresponding second utterance data of the plurality of second utterance data, wherein the retried utterance data comprises utterance data capable of being used to decide the intention of the user that is different from the first user by performing the natural language understanding.

19. The system of claim 15, wherein predicting the intention of the first user comprises:

extracting a pattern that comprises the first utterance data and has a confidence equal to or greater than a first threshold from the pattern data; and predicting the intention of the first user based on the action data of the extracted pattern.

20. The system of claim 15, wherein the program further includes instructions for:

receiving a confirmation response of the first user to the prompt from the vehicle;

calculating accuracy of intention prediction of the first user based on the received confirmation response; and correcting a confidence of the pattern that is a basis for predicting the intention of the first user using the calculated accuracy.

* * * * *